United States Patent [19]

Pearl

[11] Patent Number: 4,572,357

[45] Date of Patent: Feb. 25, 1986

[54] SHEET MATERIAL CONVEYOR WITH UNLOADING APPARATUS

[75] Inventor: David R. Pearl, West Hartford, Conn.

[73] Assignee: Gerber Garment Technology, Inc., South Windsor, Conn.

[21] Appl. No.: 574,288

[22] Filed: Jan. 26, 1984

[51] Int. Cl.⁴ .............................................. B65G 15/42

[52] U.S. Cl. ................................ 198/693; 198/688.1; 198/803.3; 198/697; 83/925 CC; 83/451; 271/275; 271/18.3

[58] Field of Search ............... 198/689, 693, 694, 692, 198/697, 698, 699, 688, 604, 605, 606, 597, 598; 271/18.3, 275; 83/925 CC, 451

[56] References Cited

U.S. PATENT DOCUMENTS

| | | | |
|---|---|---|---|
| 1,891,108 | 12/1932 | Bernotow | 198/605 |
| 2,617,518 | 11/1952 | Anderson | 198/692 |
| 2,907,076 | 10/1959 | Bean | 198/693 X |
| 3,738,476 | 6/1973 | Hullett et al. | 198/688 X |
| 4,132,304 | 1/1979 | Gent et al. | 198/698 X |
| 4,495,755 | 1/1985 | Johnson | 198/698 X |

*Primary Examiner*—Joseph E. Valenza
*Assistant Examiner*—Michael Stone
*Attorney, Agent, or Firm*—McCormick, Paulding & Huber

[57] ABSTRACT

A material unloading conveyor is arranged in overlapping relation to the discharge end of a bristle conveyor and includes an endless belt which has a plurality of U-shaped staples secured to its surface to pivot relative thereto. The staples move in combing relation to the bristles, which comprise the bristle conveyor, and the material supporting surface defined by the bristles to lift sheet material from the bristle conveyor and onto the unloading conveyor as the material is discharged by the bristle conveyor.

14 Claims, 6 Drawing Figures

SHEET MATERIAL CONVEYOR WITH UNLOADING APPARATUS

BACKGROUND OF THE INVENTION

This invention relates in general to conveyor unloading apparatus and deals more particularly with improved apparatus for unloading sheet material from a belt conveyor or the like. The apparatus of the present invention is particularly adapted for use with a conveyorized machine for working on sheet material wherein the machine conveyor includes a penetrable sheet material support surface defined by terminal ends of a multiplicity of upstanding elements, such as bristles, upon which a single sheet or a layup of sheet material comprising a plurality of sheets arranged in vertically stacked relationship may be supported while being cut or otherwise worked upon by a tool which may pass through the sheet material and penetrate the support surface.

Machines of the aforedescribed general type are used to cut woven or non-woven fabrics, synthetics, plastics, paper, leather and other materials and usually include a vacuum system for compressing a layup of material and holding it in firmly fixed position on the support surface of the conveyor while a tool moves in working relation to it in response to command signals received from a programmable controller. An apron is usually located at the discharge or return end of the machine conveyor to provide transition between the conveyor support surface and the surface of an adjacent receiving table. The conveyor moves the layup across the apron and onto the receiving table upon completion of the working cycle of the machine.

In a machine of the aforedescribed type, problems are sometimes encountered in conveying the layup to the receiving table. The weight of the layup may, for example, cause the leading edge or edges of the lowermost layer or layers of the layup to catch upon the lip of the apron and be deflected downwardly by the lip to follow the return portion of the belt conveyor. When such a machine is used to cut a woven fabric, a further problem may be encountered. As the cutting blade passes through the lowermost layers of the fabric some of the cut weave threads adjacent the blade may be forced downwardly between the closely packed bristles which define the support surface. Since vacuum is applied to the lower surface of the layup during the cutting operation, there is a further tendency for such cut thread ends to be drawn downwardly between the bristles and become lodged therebetween. This condition further contributes to the aforedescribed problem. The present invention is concerned with these problems.

SUMMARY OF THE INVENTION

In accordance with the invention, an unloading conveyor comprises a belt defining an endless surface and means supporting the belt for movement with its surface travelling in an endless path having a generally horizontal disposed portion and an arcuate return portion. A plurality of elongated material engaging elements secured to the belt surface move with the surface and relative thereto. The elements associated with the horizontally disposed portion of the surface are disposed generally adjacent the surface and extend in a generally horizontal direction whereas the elements associated with the arcuate return portion assume positions generally tangent to the return portion. The unloading conveyor is arranged in overlapping relation to the discharge end of a material conveyor which has a penetrable material supporting surface defined by a multiplicity of spaced apart support elements. The material engaging elements move in combing relation to the support elements and the material supporting surface defined by the support elements.

DETAILED DESCRIPTION OF PREFERRED EMBODIMENT

Figure 1:
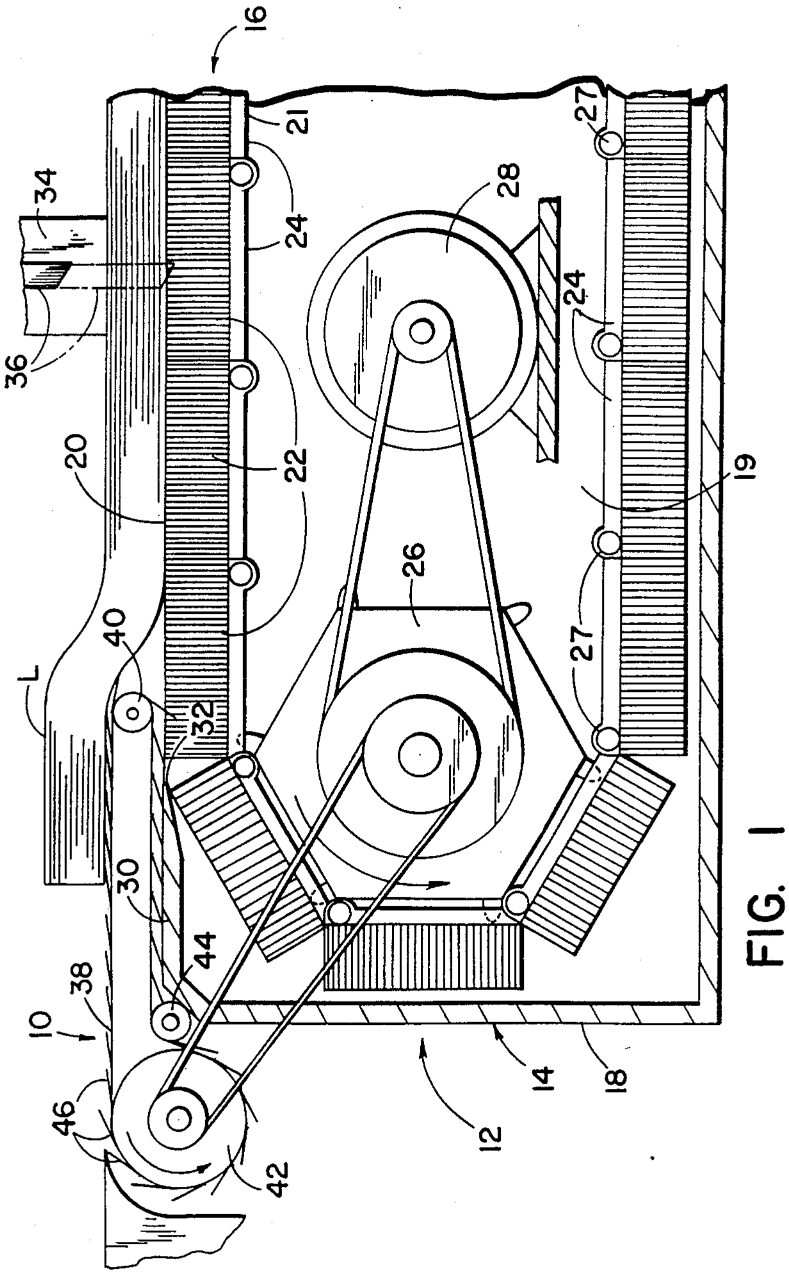
FIG. 1 is a somewhat schematic fragmentary longitudinal sectional view through a conveyorized machine for working on sheet material and having a conveyor unloading apparatus embodying the present invention.
Figure 2:
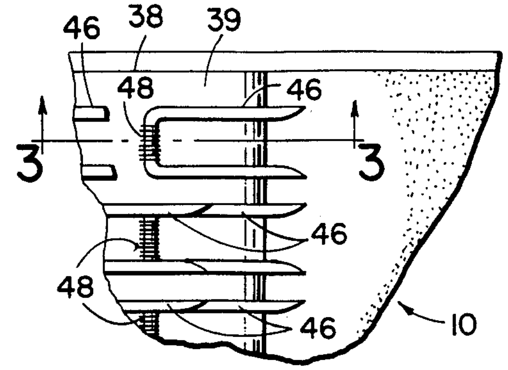
FIG. 2 is a fragmentary plan view of the machine and unloading apparatus shown in FIG. 1.
Figure 3:
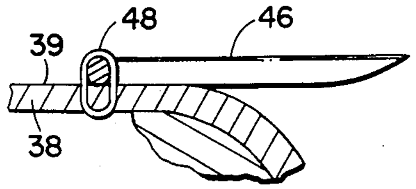
FIG. 3 is a fragmentary sectional view taken along the line 3—3 of FIG. 2.

Turning now to the drawing, and referring first to FIGS. 1-3, a conveyor unloading apparatus embodying the present invention and indicated generally by the reference numeral 10 is supported at the discharge end of a conveyorized machine for working on sheet material and indicated generally at 12. The illustrated machine 12 is particularly adapted for cutting pattern pieces from a layup of sheet material L, formed by a plurality of sheets arranged in vertically stacked relation to each other, and essentially comprises a vacuum holddown table, designated generally by the numeral 14, which includes a material conveyor of vacuum holddown type, indicated generally at 16, and a generally rectangular tank-like enclosure 18, which substantially envelopes the conveyor except for a portion of its upper run, which defines a horizontally disposed upwardly facing sheet material support surface 20. The enclosure 18 cooperates with the upper run of the conveyor 16 to define a vacuum chamber 19 below the support surface 20.

The illustrated vacuum holddown conveyor 16 has an air permeable conveyor belt 21 formed by a plurality of discrete, closely spaced elements or bristles carried by bristle blocks 22, 22. Each bristle block 22 has a perforated base and a multiplicity of bristles which project from the base. The bases of the bristle blocks 22, 22 are secured to grid plates or perforated sections 24, 24, hingedly connected to each other by transversely extending hinge pins 27, 27 to form an articulated endless bristle belt. A set of transversely spaced apart sprocket or star wheels 26, 26 (one shown in FIG. 1) support the conveyor belt 16 at the discharge or unloading end of the holddown table 14. A drive motor 28, drivingly connected to the drive sprockets 26, 26, moves the conveyor 16 in response to command signals received from a programmable controller (not shown). A vacuum holddown conveyor of the type hereinbefore described is further illustrated and described in my U.S. Pat. No. 4,328,726 on Apparatus and Method for Working on Successive Segments of Sheet Material, issued May 11, 1982, assigned to the assignee of the present invention, and hereby adopted by reference as part of the present disclosure.

A horizontally disposed apron 30 at the discharge end of the vacuum holddown table 14, and formed by a portion of the tank 18, is disposed in general horizontal alignment with the material support surface 20. A lip portion of the apron, indicated at 32, extends transversely of the table 14 proximate the junction of the upper run and return portion of the conveyor 16, substantially as shown in FIG. 1.

The machine 10 further includes a conventional tool carriage assembly 34 which bridges the table assembly 14 and which carries a tool or vertically reciprocally movable blade 36 arranged to cut through a layup, such as the layup L, and penetrate the material support surface 20. The carriage assembly 34 is constructed and arranged to move the reciprocating blade 36 longitudinally and transversely relative to the material support surface 20 in response to command signals received from the controller to cut pattern pieces from the layup L in accordance with a predetermined program, in a manner well known in the art.

Considering now the illustrated unloading apparatus 10 in further detail, this apparatus comprises an unloading conveyor supported at the discharge end of the material conveyor 16. The unloading conveyor 10 includes a belt 38 which defines an endless surface. The belt 38 has an end portion arranged in overlapping relation with the discharge end of the material conveyor 16. The illustrated conveyor belt 38 is supported by an idler roller 40 and a driven roller 42 journalled for rotation about axes which extend transversely of the machine 12. The unloading conveyor 10 is arranged to present a low profile relative to the upper surface of the vacuum holddown table 14, and for this reason idler roller 40 has a relatively small diameter, as, for example, one inch or less. The driven roller 42 is of considerably larger diameter than the idler roller 40, to frictionally engage and drive the belt 38. Another idler roller 44 journalled on the vacuum table 14 provides additional support for the belt 38, substantially as shown in FIG. 1.

Preferably, and as shown, the belt 38 has a width substantially equal to the width of the material conveyor 16. The belt 38 carries a multiplicity of material engaging or lifting elements 46, 46. The elements 46, 46 are preferably generally U-shaped and are sewn to the belt surface 39 by stitches 48, as shown in FIGS. 2 and 3, so that the parallel legs of the elements extend in the direction of conveyor movement. The elements 46, 46 are secured to the belt 38 in spaced relation to each other to pivot relative to the belt 38 and are disposed over substantially the entire surface of the belt. The elements 46, 46 associated with the upwardly facing horizontally disposed portion of the belt surface 39 are disposed generally adjacent the surface 39 and extend in a generally horizontal direction.

In the illustrated embodiment, the unloading conveyor 10 is drivingly connected to the drive mechanism for the material conveyor 16 to operate in timed relation with the conveyor 16. The conveyor 10 is arranged so that the material engaging elements 46, 46 move in combing relation to the bristles and the material support surface 20 defined by the bristles.

During the cutting cycle of the machine the material support conveyor 16 is at rest and the layup L, or at least a portion of it, is supported in a cutting region of the vacuum holddown table 14 and is retained by atmospheric pressure in a compressed firmly fixed position on the support surface 20. Upon completion of the cutting cycle vacuum applied to the under surface layup is interrupted, preferably by operating appropriate valves to admit air into the vacuum chamber and disconnect the vacuum chamber from its vacuum source. The layup is then discharged from the table by operating the conveyor 16. As the leading edge of the layup approaches the unloading conveyor 10, the material engaging elements 46, 46 move upwardly around the arcuate return portion of the conveyor surface and assume positions generally tangential to the arcuate return portion. The material engaging elements move upwardly in combing relation through the bristles and through the support surface 20 and engage the lower surface of the layup to lift the layup causing it to move upward and onto the unloading conveyor. This action also serves to dislodge any loose threads or other material associated with the lower layers or plies of the layup which may be caught between the bristles. Thus, the unloading conveyor 10 may provide a smooth transition between the vacuum holddown table 14 and a receiving table, if one is utilized, to assure uninterrupted movement of the layup from the material conveyor 16.

Figure 4:
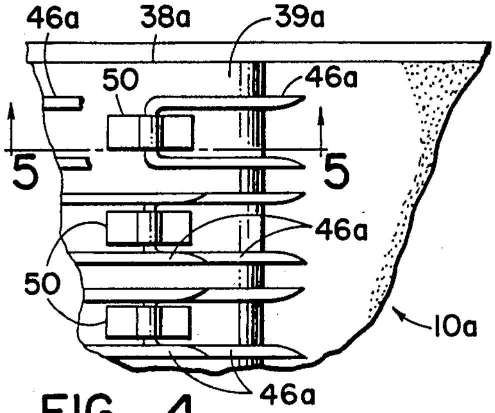
FIG. 4 is similar to FIG. 2 but shows another embodiment of the invention.
Figure 5:
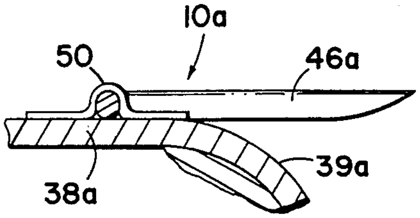
FIG. 5 is a fragmentary sectional view taken along the line 5—5 of FIG. 4.
Figure 6:
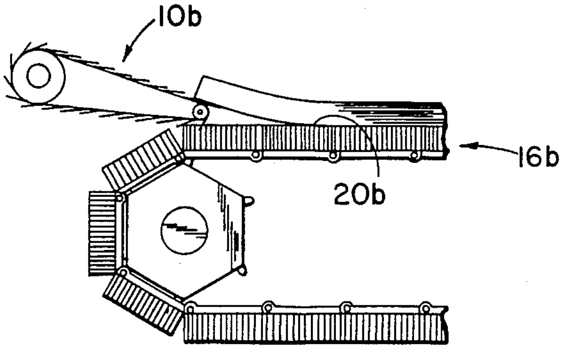
FIG. 6 is a somewhat schematic fragmentary side elevational view of a material conveyor and another unloading conveyor embodying the present invention.

Referring now to FIGS. 4 and 5, another conveyor unloading apparatus embodying the present invention and illustrated and indicated generally by the reference numeral 10*a*. The unloading apparatus 10*a* is similar is most respects to the apparatus 10 previously described but differs therefrom in the manner in which the material engaging elements are secured to the conveyor belt 38*a*. Specifically, the elements or staples 46*a*, 46*a* are attached to the conveyor belt 38*a* to move relative to the belt by strips of tape 50, 50 adhered or otherwise secured to the belt, substantially as shown in FIGS. 4 and 5. The staples 46*a*, 46*a* pivot relative to the belt 38*a* and assume tangential positions relative to the belt surface as the belt travels over the rollers which support its return portions.

In FIG. 5 there is shown another unloading apparatus embodying the invention and indicated generally by the reference 10*b*. The apparatus 10*b* which may comprise a modular unit includes an unloading conveyor which may be similar to the unloading conveyor of either of the two previously discussed embodiments. However, the conveyor 10*b* is supported in inclined relation to the material supporting surface 20*b* of a conveyor 16*b*. This inclined arrangement enables provision of a simple unloading conveyor structure of the aforedescribed type which may be readily installed on an existing material conveyor.

I claim:

1. Apparatus for unloading material from a material conveyor having a penetrable material support surface defined by the free ends of a multiplicity of spaced apart bristles, and means for driving the material conveyor to move material supported on the support surface to a discharge end of the material conveyor, said unloading apparatus comprising an unloading conveyor having a substantially planar surface portion and an arcuate return portion disposed proximate the discharge end of said material conveyor is generally overalpping relation with an associated portion of said discharge end and in the path of the material supported thereon, said unloading conveyor carrying a multiplicity of material lifting elements, means securing said lifting elements to said unloading conveyor for movement with said unloading conveyor and relative thereto, said lifting elements associated with said planar surface portion being disposed generally adjacent said planar surface portion and extending in the direction of said planar surface, said elements associated with said arcuate return portion assuming positions generally tangent to said return portion, and means for driving the unloading conveyor to move the material lifting elements in combing relation to said bristles and the discharge end portion of said material support surface defined by said bristles.

2. Apparatus for unloading material from a material conveyor as set forth in claim 1 wherein said securing means comprises means for securing said material lifting elements to said belt to pivot relative thereto.

3. Apparatus for unloading material from a material conveyor as set forth in claim 2 wherein said means for securing said material lifting elements comprise stitches.

4. Apparatus for unloading material from a material conveyor as set forth in claim 2 wherein said means for securing said material lifting elements comprise strips of tape overlying portions of said material engaging elements and adhered to said belt.

5. Apparatus for unloading material from a material conveyor as set forth in claim 2 wherein each of said material lifting elements has at least one free end portion.

6. Apparatus for unloading material from a material conveyor as set forth in claim 5 wherein said elements comprise U-shaped elements.

7. Apparatus for unloading material from a material conveyor as set forth in claim 6 wherein said elements comprise staples.

8. Apparatus for unloading material from a material conveyor as set forth in claim 1 wherein said unloading conveyor is inclined relative to the material support surface of said material conveyor.

9. Apparatus for unloading sheet material from an endless belt bristle conveyor having a material support surface defined by the free ends of bristles and means for driving the bristle conveyor to move sheet material supported on the support surface to a discharge end of the bristle conveyor, said unloading apparatus comprising an unloading conveyor including an unloading belt having an upper run and a lower run, said unloading conveyor being supported with one end portion thereof arranged in overlapping relation with an associated portion of the discharge end of said bristle conveyor and with a portion of the lower run of said unloading belt disposed in closely spaced relation to an associated portion of the material support surface, said unloading conveyor having material engaging elements and means for securing said material engaging elements to said unloading belt for pivotal movement relative thereto, and means for driving said unloading conveyor to move said material engaging elements in combing relation to said bristles.

10. Apparatus for unloading sheet material from a bristle conveyor as set forth in claim 9 wherein said material engaging elements comprise generally U-shaped elements having free end portions which move in combing relation through said bristles.

11. Apparatus for unloading sheet material from a bristle conveyor as set forth in claim 10 wherein said U-shaped elements are sewn to said unloading belt.

12. Apparatus for unloading sheet material from a bristle conveyor as set forth in claim 10 wherein said U-shaped elements comprise staples.

13. Apparatus for unloading sheet material from a bristle conveyor as set forth in claim 10 wherein said U-shaped elements are secured to said unloading belt by strips of material adhered to said unloading belt.

14. Apparatus for unloading sheet material from a bristle conveyor as set forth in claim 13 wherein said U-shaped elements comprise staples.

* * * * *